United States Patent [19]
Broussoux et al.

[11] Patent Number: 4,812,647
[45] Date of Patent: Mar. 14, 1989

[54] OPTICAL ADDRESSING DEVICE AND ITS USE IN ELECTRO-OPTICAL IMAGING DEVICES

[75] Inventors: Dominique Broussoux, Marcoussis; Francois Micheron, Gif sur Yvette; Alain Staron, Paris; Jacques Trotel, Palaiseau, all of France

[73] Assignee: Thomson-CSF, Paris, France

[21] Appl. No.: 70,703

[22] Filed: Jul. 7, 1987

[30] Foreign Application Priority Data

Jul. 7, 1986 [FR] France ............................ 86 09834

[51] Int. Cl.⁴ .................................................. H01J 5/16
[52] U.S. Cl. ........................................ 250/227; 362/32
[58] Field of Search ................ 250/227; 350/96.24, 350/96.1; 362/32

[56] References Cited

U.S. PATENT DOCUMENTS

| | | | |
|---|---|---|---|
| 3,992,620 | 11/1976 | Waller | 250/227 |
| 4,141,058 | 2/1979 | Mizohata et al. | 362/32 |
| 4,279,089 | 7/1981 | Murakami | 350/96.25 |

Primary Examiner—David C. Nelms
Attorney, Agent, or Firm—Oblon, Fisher, Spivak, McClelland & Maier

[57] ABSTRACT

The device can be used for the displacement of light lines above determined zones of a surface and for the optical identification of these zones. It comprises one or more lateral diffusion light guides arranged parallel to the surface, coupled by one end to a light source and to controlling means in order to selectively illuminate each zone of the surface by means of at least one light guide.

12 Claims, 6 Drawing Sheets

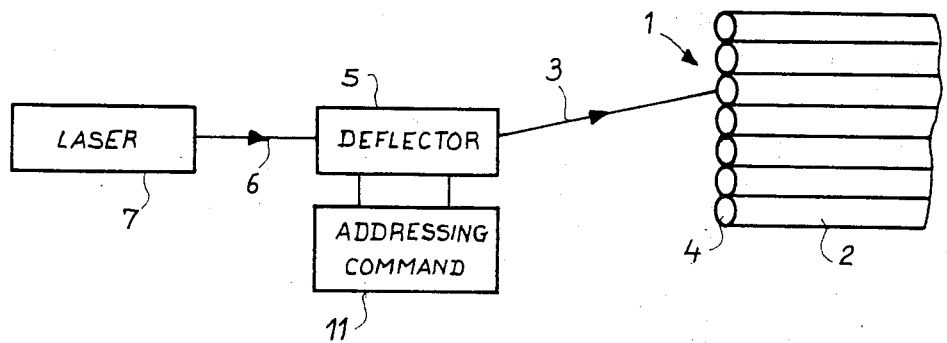
FIG_1-A
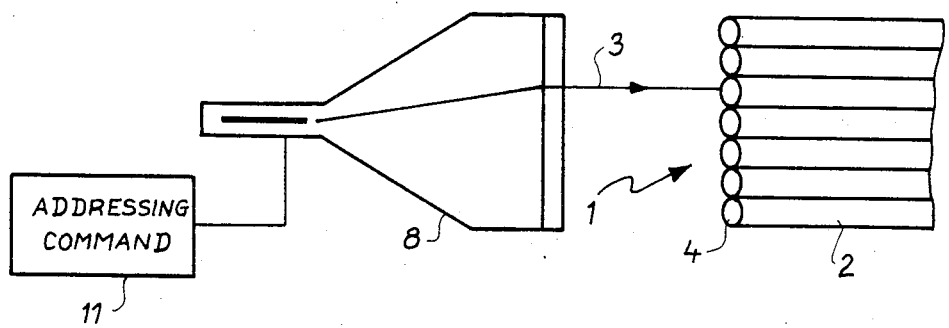
FIG_1-B
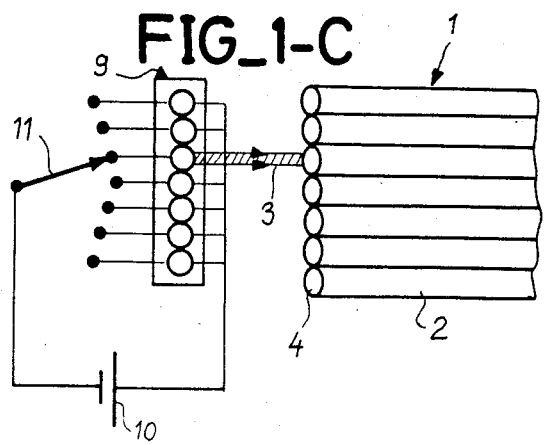
FIG_1-C

FIG_2-A
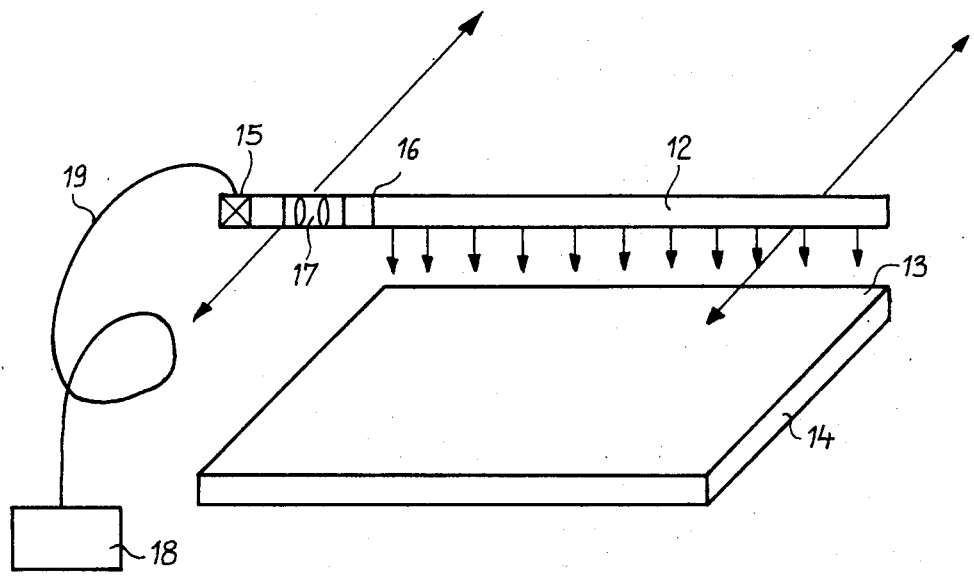
FIG_2-B
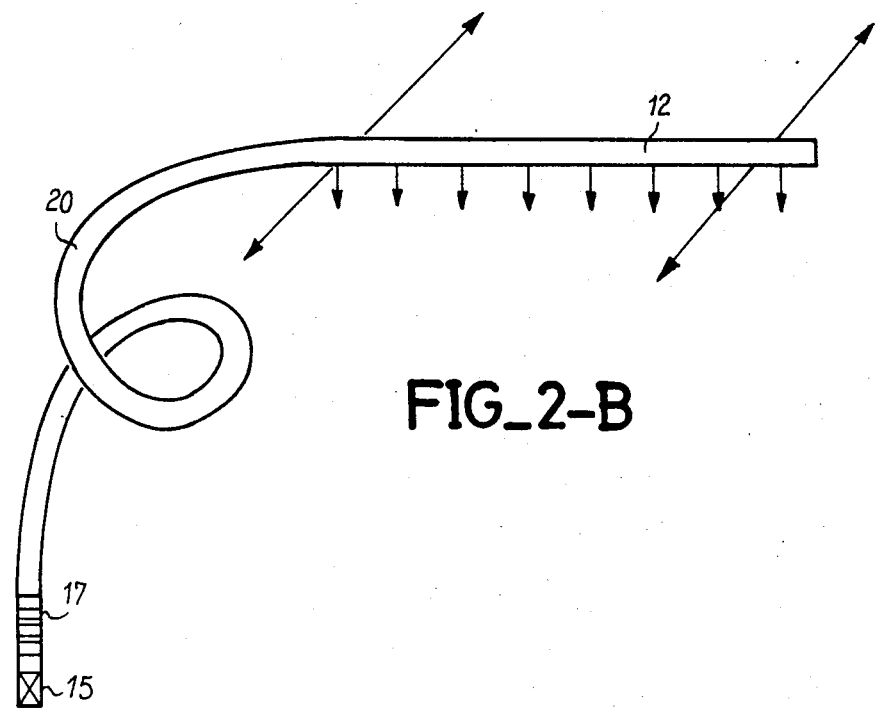

FIG_3
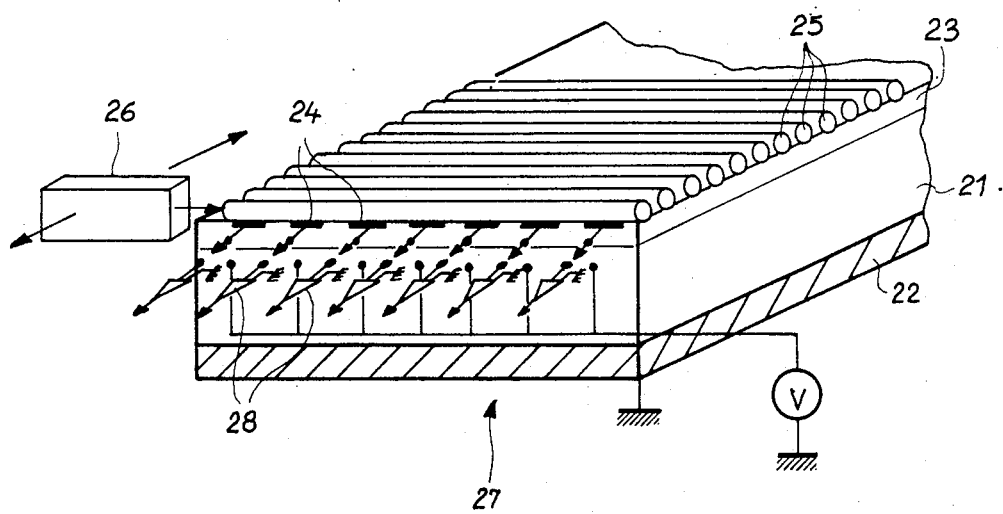
FIG_4
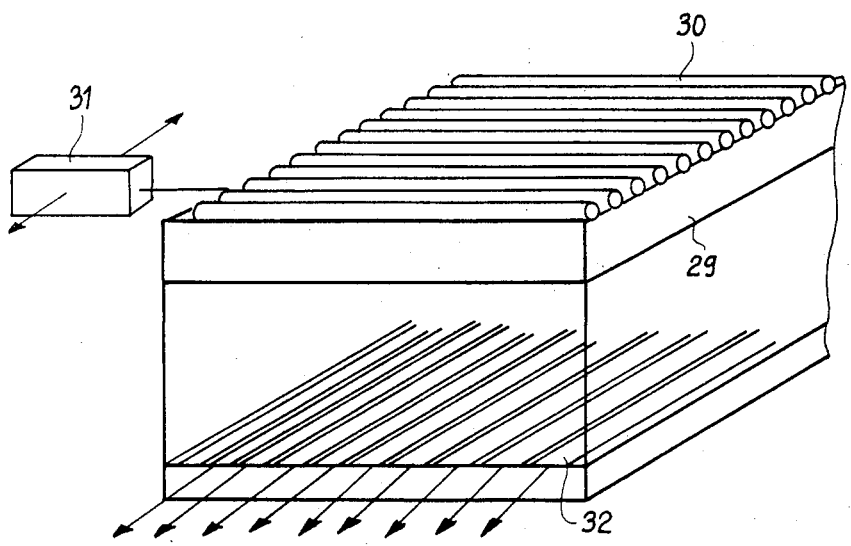

FIG_5
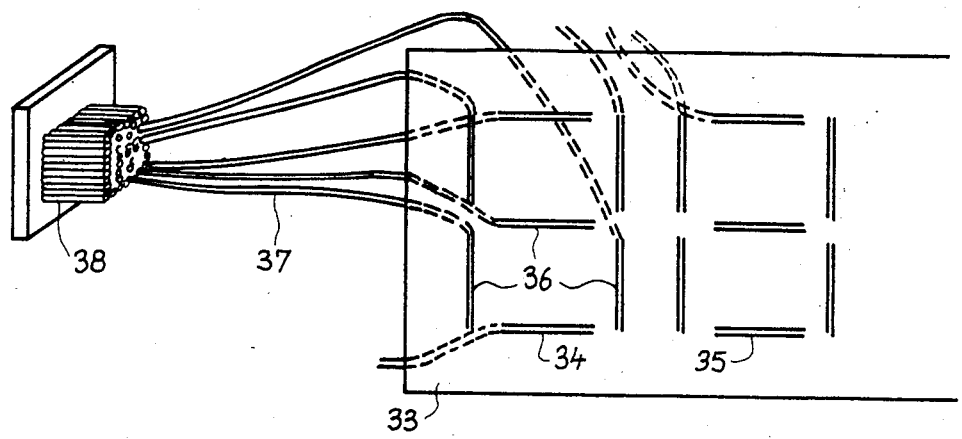
FIG_6
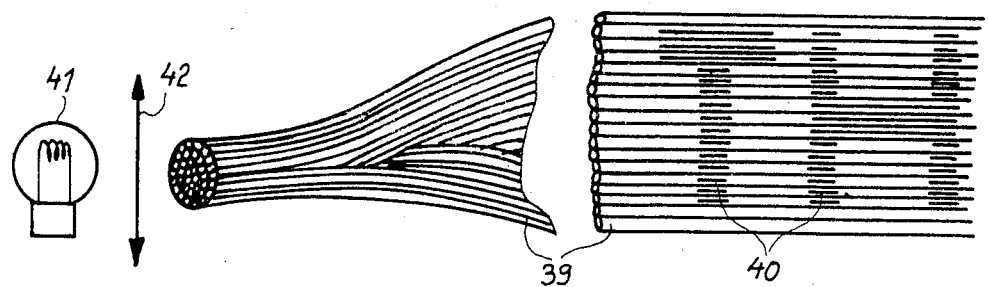

FIG_7
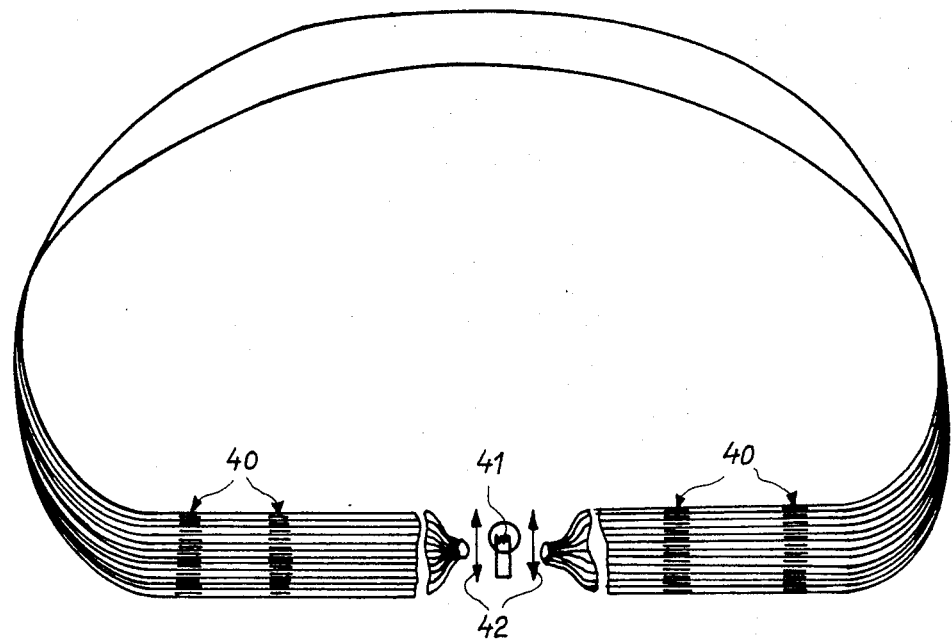
FIG_8
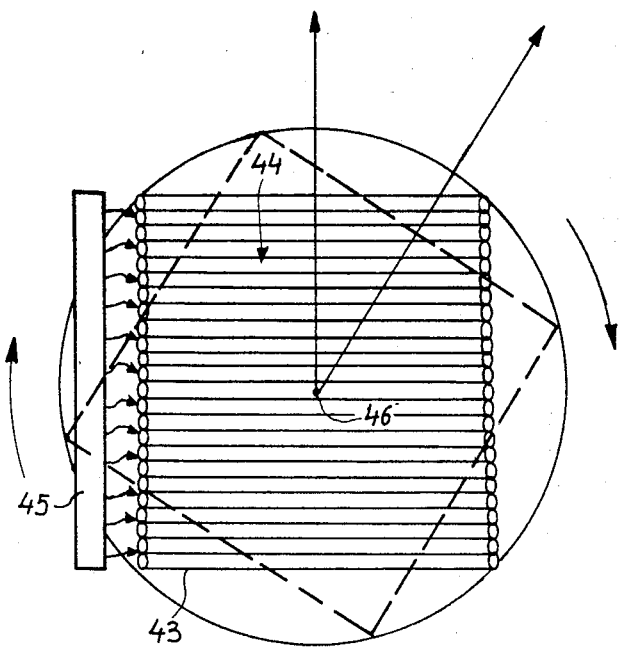

FIG_9
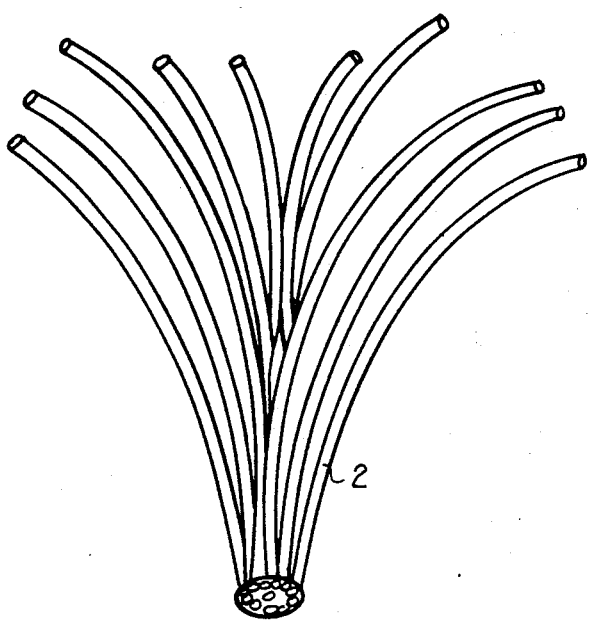

OPTICAL ADDRESSING DEVICE AND ITS USE IN ELECTRO-OPTICAL IMAGING DEVICES

BACKGROUND OF THE INVENTION

1. Field of the Invention

The present invention pertains to an optical addressing device and its use in electro-optical imaging devices.

The invention applies especially to the making of imaging devices wherein optical addressing is used to reveal each pixel of a previously recorded latent image, in the form of either an electrical or a light signal.

The invention also applies to display devices for the presentation of information and to the making of display screens for image construction in medical imaging devices.

2. Description of the Prior Art

Optical addressing imaging devices of the prior art may be classified under two categories which are determined by the physical manner in which each pixel of a recorded image is revealed by the imaging device.

In the first category, descriptions of which can be found, for example, in the U.S. Pat. Nos. 4,446,365, 4,547,670 and DE No. 3,235,076, the effect of an optical reading excitation on each recorded pixel of the image produces an electrical signal.

In these imaging devices, the electrical charges photo-induced in recording are preserved for each pixel in a photoconductive device which has an inhibiting electrode. When reading, the charges trapped during the recording are compensated for by photo-induced charges, causing a current in the reading circuit which is proportionate to the number of charges compensated for, hence proportionate to the local intensity of the recorded image.

In the second category, for which a corresponding description can be found in the European Pat. No. 0,138,024, the latent image memorized during the recording is revealed directly in the form of optical signals through the action of the addressing devices.

Since, in these imaging devices, the image recording medium has a plane shape on which lies the matrix of the pixels of the recorded image, the addressing system applied is a Cartesian addressing system along the directions X and Y of the rows and columns of the matrix organization, and the reading of each pixel is done by the scanning of a thin pencil of light which illuminates each pixel located at the intersection of a row and a column of the matrix in a direction perpendicular to this plane. This addressing and reading mode, whether it is effected directly by a laser beam deflected in X and Y by means of mirrors or indirectly by means of an optic fiber set in a direction perpendicular to the matrix plane and shifted in X and Y facing each pixel of the matrix, is constrictive as regards both design (for the resulting product is bulky) and efficiency because of the electromechanical devices used which, by their nature, have limited speed of movement.

3. Summary of the Invention

The purpose of the invention is to remove the above disadvantages.

To this end, the object of the invention is an optical addressing device which can be used to move the luminous lines above determined zones of a surface and for the optical identification of these zones, a device comprising one or more lateral diffusion light guides arranged in a direction parallel to the surface, coupled by one end to a light source and to control means so as to selectively illuminate each zone of the surface by means of at least one light guide.

Other characteristics and advantages of the invention will appear below in the following description made with reference to the appended drawings of which:

BRIEF DESCRIPTION OF THE DRAWINGS

FIGS. 1A, 1B and 1C are various embodiments of addressing devices according to the invention;

FIGS. 2A and 2B are embodiments of an addressing device according to the invention, moved by a translational motion;

FIG. 3 is an application of the device of the invention to the optical addressing, by means of a flat array, of a photoconductive imaging device;

FIG. 4 is an application of the device of the invention to optical addressing, by means of a flat array, of an imaging device using a memory scintillator;

FIG. 5 is a display device using lateral diffusion optic fibers;

FIG. 6 is an example of an embodiment of a luminous signboard;

FIG. 7 is a lateral diffusion optic fiber strip used for beaconing;

FIG. 8 is a display screen using an array of lateral diffusion fibers organized in an addressed flat array with an addressing device according to the invention.

FIG. 9 is an organization of lateral diffusion optic fibers in a beam, provided with an addressing device according to the invention which can be used for decorative purposes.

DETAILED DESCRIPTION OF THE INVENTION

The addressing devices of the invention, which are shown in FIGS. 1A, 1B and 1C comprise flat arrays 1 of light guides formed by optic controlled lateral diffusion optic fibers 2 set parallel to one another in the same plane. These fibers are excited separately by an optical harness 3 which can be moved in front of each of the light inputs 4 of the fibers 2 located at one of their ends. The selective excitation of each of the fibers 2 of a flat array 1 is obtained in FIG 1A by a deflector 5 whicih deflects the light beams 6 transmitted by a laser light source 7. It is obtained in FIG. 1B by a device for the deflection of a luminous spotlight transmitted by a cathode screen 8 of the type which is still known as "flying spot" and in FIG. 1C by a small bar or matrix 9 transmitting polarized light by an electrical power source 10. In the three examples shown, the selective excitation is controlled by control means 11.

For the optical addressing devices shown to function properly, the optic fibers 2 may be fibers made of plastic, polymethylmethacrylate (PMMA) or polystyrene (PS), fibers in which the rate of lateral diffusion along their surface between their two ends may reach high levels, and the normal diffusion of which may be further increased by modifying, for example, the structure of the fibers in one or more neighbouring zones of their surface so that, when a fiber is crossed by a light ray, firstly there are multiple reflections which impede the advance of the light and secondly, the light rays are let out through the element of the surface of the fiber covering the modified zone.

To obtain this structural modification, several mechanical, physico-chemical or chemical methods may be used independently of one another or, if necessary, in a complementary way. Mechanically, the structural modification may be got, for example, for fibers with sheathed cores, by locally reducing of the thickness of the sheath surrounding the core: this may be done by scraping, grooving or any equivalent mechanical method or yet again, by irreversibly modifying the cross-section of the fiber, finally by rolling.

At the physico-chemical level, elements may be included in the fiber during manufacture: these may be elements made of solid powder, metallic elements, abrasives, etc. Or yet again, non-miscible polymers such as polystyrene with polymethylmethacrylate may be mixed into the diffusion zone.

At the chemical level, the surface of the fiber lining the diffusion zone may be attacked by means of a solvent.

Rather than using optic fibers organized in sheaths, another alternative embodiment of the addressing device according to the invention, shown in FIG. 2 consists in using only one lateral diffusion optic fiber which can be moved mechanically above a surface to illuminate specified zones of this surface.

In FIG. 2A, a single optic fiber 12 is driven in a translational motion parallel to a plane surface 13 of an object 14. A ligth source 15 is coupled to an end 16 of the fiber 12 by means of an optical coupler 17. An electrical source 18 provides power to the light source 15 by means of a power cord 19.

In the device of the FIG. 2A, the light source 15 is moved with the fiber 12, but it can also be planned to keep the light source 15 and the optical coupler 17 fixed by providing for a flexible optical coupling 20 to link the useful part 12 of the fiber to the optical coupler 17, and it should be possible to do this coupling for the non-active part of the fiber which must have sufficient slack to provide for displacements of the useful part 12 of the fiber.

An example of the use of an addressing device according to the invention to make a photoconductor imaging device is shown in FIG. 3.

In this example, a photoconductive material 21 is deposited on a uniform electrode 22 which is transparent to the radiation to be imaged and is taken to a potential of zero volts. On the photoconductive material 21, a uniform dielectrical layer 23 is deposited. Column electrodes 24, transparent to the reading radiation, are deposited in strips, with a width equal to one pixel, on the dielectrical layer 23. A flat array of lateral diffusion optic fibers 25 is placed above the plane formed by the column electrodes 24, the fibers 25 being perpendicular to the electrodes 24, thus forming all the rows. Although, in this example, the fibers 25 an be selected optically by one of the processes described previously with reference to the FIGS. 1A, 1B and 1C, in the case of FIG. 3, they are addressed by the movement of a light source 26.

When recording, the image is projected on the imaging device, with all the columns being subjected to the same potential V by means of inverters 27 placed on the column electrodes 24, with the reading optical source 26 extinguished.

When reading, the column electrodes 24 are connected to reading amplifiers 28 and the light source 26 addresses each of the fibers arranged in lines. The reading amplifiers 28 then give, in parallel, the signals corresponding successively to each line addressed.

An example of the use of an addressing device according to the invention for making the photoconductive imaging device, the latent image of which is revealed by light emission, is shown in FIG. 4.

In this example, a scintillator plane 29 with an optically stimulated memory, is in contact with a flat array 30 of controlled lateral diffusion fibers, which can be optically selected by any one of the methods described above with reference to FIGS. 1A, 1B and 1C or by translation of a single source 31 as shown in FIG. 4. The other side of the scintilator 29 is optically coupled to strips of column photodetectors 32.

When recording, the scintillator 29 is subjected to the image to be recorded, if necessary outside the space occupied by the flat array 30 of fibers, if for example, the fibers are not transparent to the recording wave length.

When reading, the optic fibers of the flat array 30 are addressed successively by the optical source 31. The photodetectors of the plane 32, successively provide, in parallel the signals corresponding to the successively addressed lines.

An example of an addressing device according to the invention for the embodiment of a display unit is shown in FIG. 5.

The display unit shown comprises a substrate 33 on which the following are fixed by bonding or embedding: patterns 34, 35 made up of 7 parts, each of these parts 36 comprising a lateral diffusion optic fiber.

These fibers 36 are arranged in such a way that their position in the pattern makes it possible to register the FIGS. 0 to 9 or the letters A to Z. The patterns are arranged in the plane in rows and columns which are of a sufficiently large number so that words, sentences or messages can be composed if need be.

The sizes of the patterns 34, 35 can be adjusted according to need, depending on dimensions ranging from a few millimeters to a few centimeters by the appropriate grooving of the substrate 33 and a chosen diameter of the fiber. The non-diffusing parts 37 of the fibers exit by the rear side of the display unit and are arranged in such a way that they can be used for addressing.

The optical addressing can be done by a coded matrix of light-emitting diodes 38 or by a "flying spot". Each position of the spotlight is refreshed at a frequency of 50 Hz to prevent flickering or flashing. A moving message may be diffused by modifying, in the course of time, the intensity of the light entering each fibers.

Examples of the use of an addressing device according to the invention to make an illuminated signboard or beaconing system are shown in FIGS. 6 and 7.

In FIG. 6, the signboard shown comprises a ribbon of fibers 39, the number of which varies according to the size of the signboard. The letters or figures forming the message are, for example, registered in the ribbon by local grooves 40 in each of the fibers.

For the beacon shown in FIG. 7, the light bands 40 are created simultaneously by zones on all the fibers of the ribbon 39. In the two previous embodiments, the fibers are naturally excited by a light source 41 through capacitors 42.

An example of a use of a display screen consisting of rotating fibers is shown in FIG. 8.

In this example, each fiber 43 of an array 44 of parallel fibers, arranged in one and the same plane, represents a line of a screen with which there is associated a light excitation 45, produced by a laser or a light-emitting diode at the end of the fiber.

The array comprises N fibers 43 and the image is re-created by rotating the entire unit around an axis of rotation 46 perpencidular to the plane of the figure by successive, angular elementary pitches.

During the rotation, the array 4 of fibers 43 takes up P different, angular positions. To each of these positions corresponds a set of N excitations for the N fibers of the array.

During the rotation, the array 44 of fibers 43 takes P different angular positions. To each of these positions, there corresponds a set of N excitations for the N fibers of the array.

With suitably chosen excitations, this device makes it possible to display an image of a quality that varies according to the value of P ($1<P<N$).

In choosing P=N, a very good image is obtained, equivalent to one which would be obtained with a resolution of N×N points.

This principle naturally contains the assumption that image detector associated with the screen is capable of performing an integration.

However, in the case of a screen, it must be assumed that the detector is the eye, which has an integration period of 40 ms. In this case, it is enough to have all the information needed to re-create the image in less than 40 ms. This information is obtained when the array performs at least one rotation, which requires a rotational speed of more than 1,500 rpm.

Again, in the case of the screen, the frequency of the light excitation will be P/40×100 Hz for each the fibers 43. It will be seen to it that this frequency is always greater than 58 Hz which is the limit below which the flickering creates difficulties.

If instead of the human eye, the integrator used is a device which can imprint a film, the only constraint then will be that of the intensity of the light pulse depending on the sensitivity of the film.

Finally, an example of the use of the addressing device according to the invention for artistic compositions is shown in FIG. 9. For it is possible to provide for using lateral diffusion optic fibers 2 for decorative purposes to make, for example, garlands of diffusing fibers which are shaped like bunches of flowers or which are stuck, for example, to a wall to serve as a medium for a message.

Naturally, the embodiments of the invention described above, may also lend themselves to many alternative forms of execution, and a modification of the devices described above may consist, for example, in the use of frequency transfer fibers instead of controlled lateral diffusion fibers, namely optic fibers which are absorbent at the wavelength $\lambda_1$ of the source and which are luminescent at a wavelength $\lambda_2 > \lambda_1$. In this respect, scintillating plastic fibers are available on the market for the ultra-violet→blue and blue→green transfers. The diversity of the luminescent colorants is such that all wavelengths up to the infra-red can be created from a source with a smal wave-length (ultra-violet for example). This latter feature could also be used for polychromatic displaying and announcing devices.

What is claimed is:

1. An optical addressing device for the optical identification of zones on a surface of a photoconductor imaging device, comprising one or more lateral parallel diffusion light guides arranged in a flat array in a direction parallel to the surface and diffusing light on the whole length of each guide, coupled by one end to a light source and to control means so as to selectively illuminate each zone of the surface by means of at least one light guide, and reading means for successively producing signals corresponding to each zone addressed by said one or more lateral diffusion light guides.

2. Device according to the claim 1, further comprising:
   means for moving at least one light guide parallel to the surface.

3. Device according to the claim 2, wherein the light source is a laser.

4. Device according to the claim 3, further comprising:
   means for deflecting the light beam of the laser to the inputs of the one or more light guides.

5. Device according to the claim 3, further comprising:
   means for shifting the laser in front of the inputs of each of the light guides to address each light guide.

6. Device according to the claim 2, wherein the light source is a flying spot device.

7. Device according to the claim 2, wherein the light source is made up of a strip of light emitters.

8. Device according to the claim 7, wherein the light guides are provided by controlled lateral diffusion optic fibers.

9. Device according to the claim 7, wherein the light guides are formed by scintillating optic fibers.

10. An optical addressing device according to claim 1, wherein the photoconductor imaging device comprises:
    a photoconductive material having a first face covered by an uniform transparent electrode and a second face parallel to the first face covered by a dielectrical layer; and
    column transparent electrodes deposited above said dielectrical layer, said one or more lateral parallel diffusion light guides being disposed above the plane formed by said dielectric layer in a direction perpendicular to the direction of the column transparent electrodes.

11. An optical addressing device according to claim 1, wherein:
    the photoconductor imaging device comprises a scintillator plane with an optically stimulated memory, said scintillator plane having a first face covered by said lateral parallel diffusion light guides and a second face parallel to the first face; and
    said reading means comprising strips of column photodetectors disposed perpendicular to said one or more lateral parallel diffusion light guides opposite said second face of said scintillator plane, said scintillator plane being coupled to said column photodetectors via said second face.

12. An optical addressing device according to claim 10, wherein said reading means comprises amplifiers coupled to the column transparent electrodes.

* * * * *